United States Patent [19]

Linsmeier

[11] 3,766,721
[45] Oct. 23, 1973

[54] HARVESTING MACHINE EQUIPPED WITH STONE GUARD

[76] Inventor: Howard T. Linsmeier, Saukville, Wis. 53080

[22] Filed: Oct. 16, 1972

[21] Appl. No.: 297,871

[52] U.S. Cl.................... 56/10.3, 56/16.5, 198/213
[51] Int. Cl............................................. A01d 45/02
[58] Field of Search............ 56/10.3, 16.5, DIG. 15; 130/27 JT, 27 T; 198/64, 104, 213

[56] References Cited
UNITED STATES PATENTS

| | | | |
|---|---|---|---|
| 1,235,427 | 7/1917 | Bridewell et al................ | 198/213 X |
| 1,521,044 | 12/1924 | Parker............................ | 198/213 X |
| 2,455,750 | 12/1948 | Freed................................. | 198/64 |
| 2,741,435 | 4/1956 | Borner............................. | 198/213 X |

Primary Examiner—Louis G. Mancene
Assistant Examiner—J. A. Oliff
Attorney—Ira Milton Jones

[57] ABSTRACT

A corn harvesting machine having a stone guard in each of its four screw conveyors which carry the ears of corn that have been snapped off the stalks upwardly to the shelling instrumentalities of the machine, to keep stones that may be picked up by the machine, as it traverses the corn field, from entering the shelling instrumentalities; each stone guard consisting of a row of abutments welded to the inner surface of the trough of the screw conveyor and disposed transversely thereof to block passage of a stone being carried along by the flighting of the conveyor auger.

7 Claims, 6 Drawing Figures

PATENTED OCT 23 1973 3,766,721

HARVESTING MACHINE EQUIPPED WITH STONE GUARD

This invention relates to harvesting machines such as corn harvesting machines that move across a corn field along the rows of corn thereon, rip or snap the ears of corn off the stalks, and convey the ears to shelling instrumentalities which form a vital part of the machine and by which any husks, still on the ears are removed therefrom, and the kernels are rubbed off the cobs to drop onto screens from which they are conveyed to a bin on the machine while the husks and cobs are suitably discharged from the machine. As can be readily understood, the shelling mechanism though adequately husky and capable of performing the task for which it is designed, is likely to become damaged by stones carried along with the ears of corn. That possibility is very real since the part of the machine which acts upon the stalks and brings them to the snapping rolls by which the ears are torn from the stalks includes conveyor fingers that travel in orbits which reach down to the ground.

In recognition of that possibility this invention has as its purpose to provide corn harvesting machines with what might be called stone guards that keep stones that are picked up by the machine from reaching the vital parts of the machine, especially its shelling instrumentalities.

To that end the invention contemplates the provision of a stone arresting barrier in each of the upwardly inclined screw conveyors that receive the ears that are torn or snapped off the stalks and advance them towards the vital parts of the machine.

More specifically the invention has as its purpose to provide barriers in the troughs in which the augers of the aforesaid screw conveyors turn, which barriers are so placed and dimensioned that they form fences which block passage of stones advanced by the augers along with the ears of corn and cause such stones to become wedged between the fence-forming barrier and the auger. While rotation of the auger will stop when that occurs the machine will not be damaged since the drive to the augers includes a slip clutch.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which.

Figure 1:
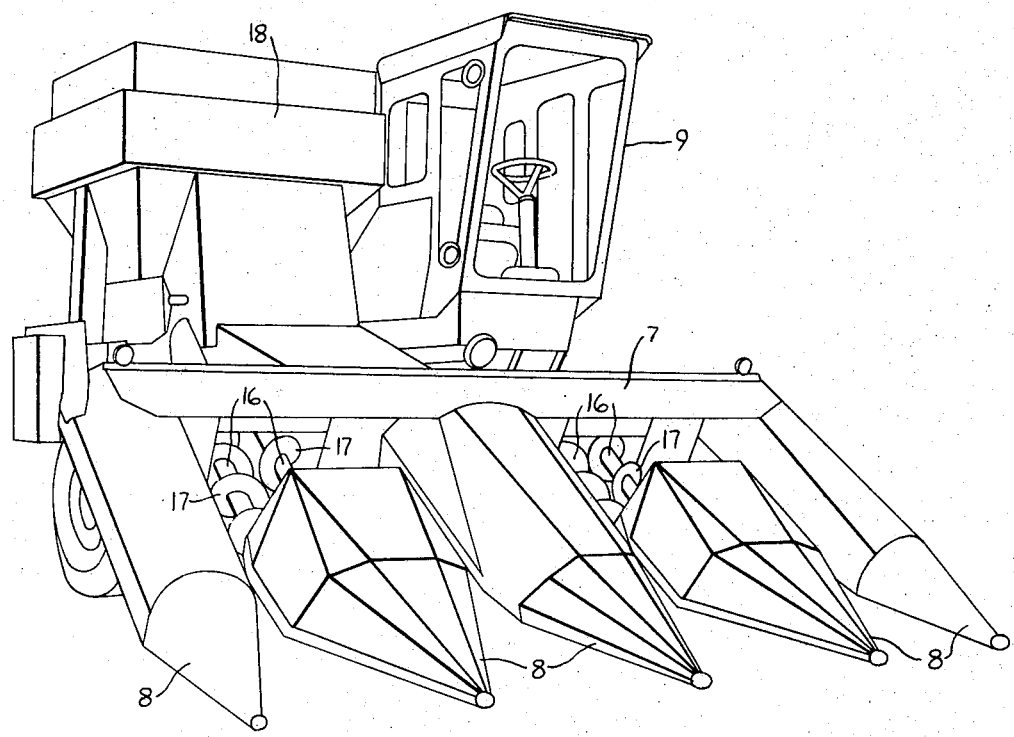
FIG. 1 is a perspective view of a corn harvesting machine of the type to which this invention pertains.
Figure 2:
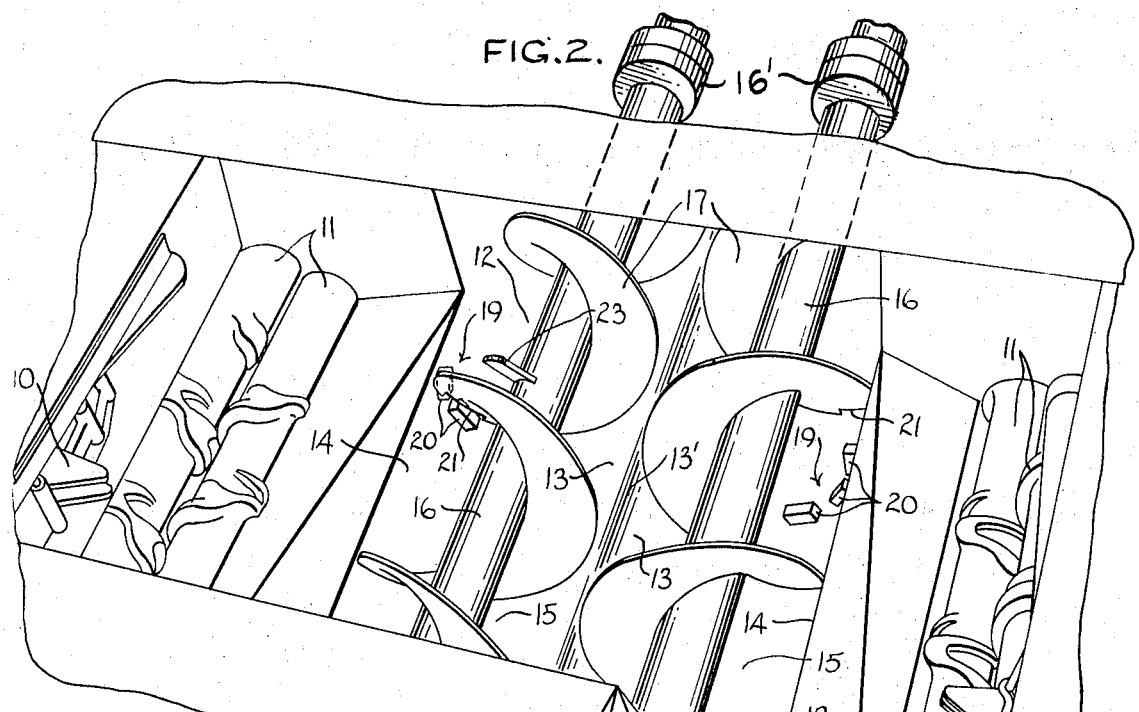
FIG. 2 is a perspective view looking down into the part of the machine by which ears of corn are torn or snapped off the stalks and conveyed towards the husking and shelling instrumentalities.
Figure 3:
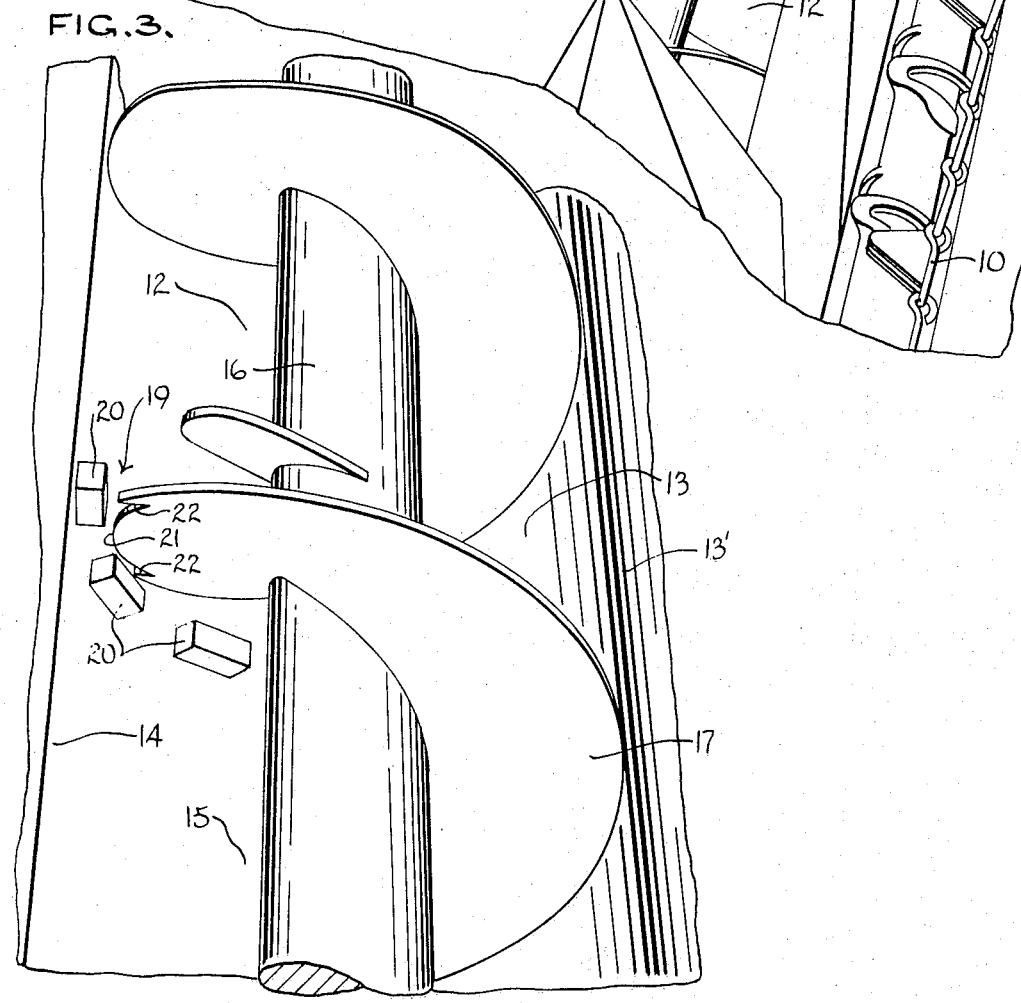
FIG. 3 is a close-up perspective view of a portion of the structure shown in FIG. 2 and illustrating one of the stone guards of this invention.

Referring to the drawings, FIG. 1 illustrates a self-propelled corn harvesting machine of the type to which this invention appertains. This machine is equipped with a four-row stripper plate 7, the fingers 8 of which simultaneously embrace four rows of corn as the machine traverses a corn field under guidance by an operator in the cab 9. As the machine advances, endless chain conveyors operating in the spaces between the fingers 8 — portions of which are visible in FIG. 2 where they are identified by the numeral 10 — position the stalks between paired snapping rolls 11, also seen in FIG. 2. These snapping rolls remove most of the husks from the ears of corn as they tear the ears from the stalks and throw them into open-topped troughs 12 that extend alongside the snapping rolls and, like them, are disposed at an upwardly inclined angle.

There are four of these troughs arranged in two pairs with the troughs of each pair side-by-side and sharing a common inner side wall 13 which is lower than the outer side walls 14 of the troughs. The outer side walls have vertical upper portions that merge tangentially with round bottom walls 15 that extend to and form part of the common inner side walls 13. The junction of the inner side walls forms a ridge 13'.

Each trough has an auger 16 rotatably mounted in it with the edge of its flighting 17 concentric with and closely sweeping the round bottom of the trough as the auger turns. The augers and the round bottomed troughs in which they rotate thus provide open-topped upwardly inclined screw conveyors that constitute part of a conveyor system by which the ears of corn are carried to shelling instrumentalities (not shown) in the upper portion of the machine.

The shelling devices are vital parts of the machine, for it is here where any remaining husks are removed from the ears and the kernels are rubbed off the cops to be delivered to a receiving bin 18.

Although the shelling instrumentalities are rugged and fully capable of performing their assigned tasks, stones and rocks entering those vital parts of the machine can cause serious damage thereto. Also it is most difficult to get stones and rocks out of the shelling instrumentalities. Often this requires dismantling much of the machine. It is important, therefore, to keep stones and rocks from reaching that mechanism. That is the purpose of this invention.

Like the ears of corn that are ripped off the stalks, any stones picked up by the chain conveyors 10 that bring the stalks into the grip of the snapping rolls, wind up in one or the other of the four troughs 12. Since the lower end of the orbits of the chain conveyors 10 is close to the ground, it is not uncommon for these conveyors to pick stones off the ground and carry them to the snapping rolls which throw the stones along with the ears of corn into the adjacent troughs 12.

Figure 4:
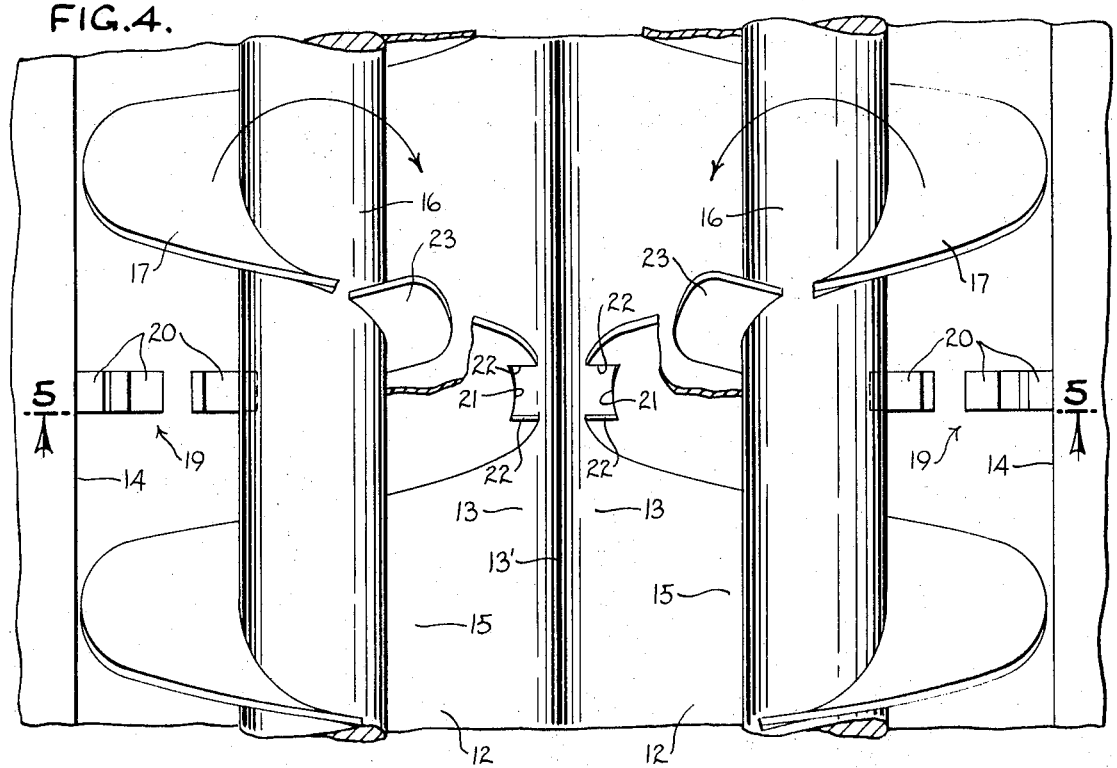
FIG. 4 is a plan view of the structure shown in FIG. 3.
Figure 5:
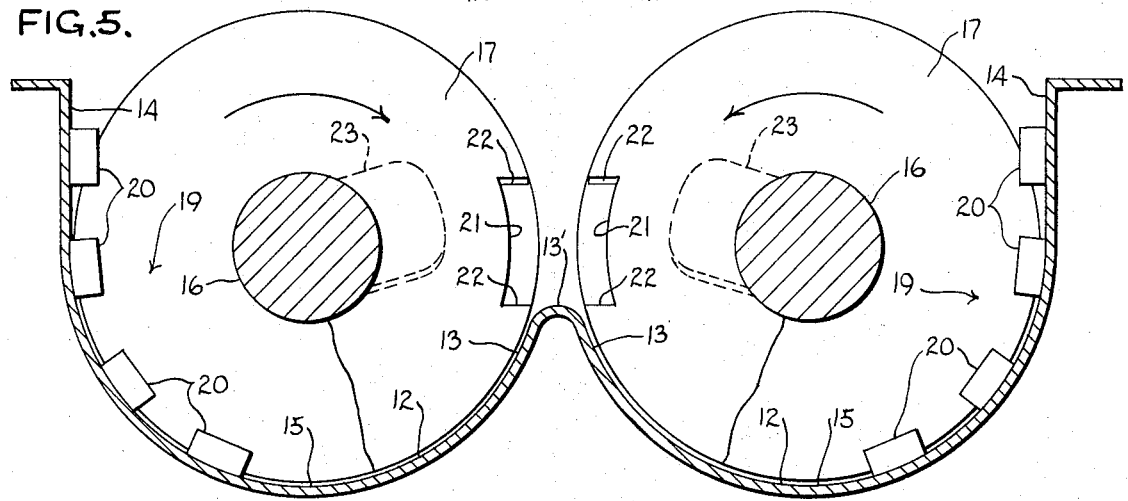
FIG. 5 is a cross sectional view through FIG. 4 on the plane of the line 5—5.

Any stone thus thrown or carried into a trough will be advanced along with the ears of corn by the helical flighting of the rotating auger in that trough; but before the stone can reach the upper end of the trough, its advance will be blocked by barrier means 19 with which each trough is equipped. This barrier means consists of a plurality of spaced lugs or abutments 20 welded to the inner surface of the trough in a row that lies athwart the path of a stone being advanced by the auger and in a plane normal to the axis of the auger. These lugs or abutments are preferably of the same size and shape and in effect form a fence that rises from the inner surface of the trough at the side thereof at which the direction of rotation of the auger flighting is upward; and which in each instance is the high outer side wall 12 since the augers of the paired troughs turn in opposite directions as indicated by the arrows in FIGS. 4 and 5.

To accommodate the fence formed by the lugs or abutments 20, the adjacent portion of the auger flighting has a notch 21 in its peripheral edge. This notch allows the edge of the flighting upstream and downstream of the fence to be closely adjacent to the inner concave surface of the trough. Preferably the notch 21 is of such size and shape that its end edges 22 just clear the adjacent upstream and downstream sides of the lugs or abutments, which means that with those sides flat and parallel, as shown, the end edges 22 of the notch will also be straight and parallel, as best seen in FIG. 6.

Figure 6:
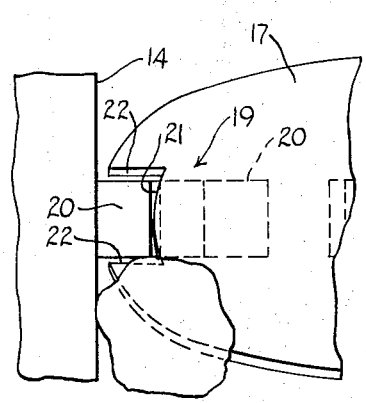
FIG. 6 is a fragmentary detail view looking down onto one of the barriers and showing how it coacts with the auger flighting to grip or wedge a stone therebetween.

During operation of the machine, any stone that is carried along a trough and collides with the fence formed by the row of lugs or abutments 20, will be wedged between the fence and the adjacent portion of the auger flighting 17, as depicted in FIG. 6. While a stone thus held will stop rotation of the auger, no damage to the machine will result since the drive for each pair of augers incorporates a conventional slip clutch as indicated at 16 in FIG. 2.

When a stone is thus gripped, the operator simply stops the machine, climbs down from the cab and dislodges the stone.

The fences formed by the transverse rows of lugs or abutments afford good assurance against stones that are smaller than approximately four inches in diameter being delivered to the vital parts of the machine, but larger rocks — which, too, are often picked up — will not be stopped by the fences. Such larger rocks will ride the ridge 13' formed by the junction of the inner side walls of the paired troughs as one or both of the augers therein propel the same upward. To guard against such rocks reaching the vital parts of the machine, a fin 23 is welded to the axle of each auger directly upstream of the notched portion of its flighting, at a location spaced angularly ahead of the notch in the direction the auger turns. Any relatively small stone that might have a tendency to roll over the fence will therefore be wedged against the fence by the fin 23 or moved to a location where the advancing auger flighting can wedge it against the fence. But perhaps more important, the fins of the paired augers — by rotating towards one another at the top of their orbits — will wedge a rock against the ridge 13' or between the two approaching fins. In either event, auger rotation will be stopped. For this to occur, it is of course necessary that the augers be synchronized and remain in synchronization; but, since a single slip clutch serves both augers of each pair, this need for synchronization presents no problem.

The presence of the stone arresting fence in each trough does not interfere with the advance of the ears of corn due to the difference in shape and texture of the stones or rocks and the ears of corn. In other words, the more or less slippery surface and cylindrical shape of the ears of corn allows them to slide freely over the fence, whereas the unyielding, abrasive surface and irregular shapes of stones causes them to be jammed against the fence.

Those skilled in the art will appreciate that the invention can be embodied in the forms other than as herein disclosed for purposes of illustration. Thus, for instance, a combine that travels across the ground as it gathers the crop and has threshing instrumentalities that should be protected from damage by stones picked up by the machine, would be benefited by this invention.

The invention is defined by the following claims:

I claim:

1. In a harvesting machine of the kind that travels across the ground as it gathers the crop, and has instrumentalities by which the gathered crop is processed and to which instrumentalities the gathered crop is delivered by conveyor means including at least one screw conveyor having an auger rotating in an elongated duct, the improvement whereby stones that are picked up by the machine as it travels across the ground are kept from reaching said instrumentalities, said improvement comprising the combination of:

A. barrier means on the inner surface of the duct, said barrier means being transverse to the axis of rotation of the auger and forming a fence to block passage of a stone that has been deposited in the duct and is carried along the duct by the auger, without preventing passage of the crop, and by so blocking the passage of the stone causing it to be wedged between the barrier means and the adjacent portion of the auger flighting; and B. drive means for the auger including a slip clutch which permits the auger to stop rotating when a stone becomes wedged between it and the barrier means.

2. In a harvesting machine, the improvement set forth in claim 1, wherein said barrier means comprises a plurality of abutments projecting from the inner surface of the duct and arranged in a row lying in a plane normal to the auger axis.

3. In a harvesting machine, the improvement set forth in claim 2, wherein the portion of the auger flighting in line with said row of abutments has a notch to accommodate the abutments so that the edge of the auger flighting upstream and downstream of the row of abutments may be closely adjacent to the inner surface of the duct.

4. In a harvesting machine, the improvement set forth in claim 3, wherein said notch has a bottom edge and end edges, the latter being substantially parallel to one another and spaced apart a distance such that said end edges travel in planes closely adjacent to the upstream and downstream sides of the fence formed by said abutments.

5. In a harvesting machine, the improvement set forth in claim 3, further characterized by a fin projecting radially from the axis of the auger at a point angularly in advance of the notch of its flighting and close enough to the plane defined by the rotating notch as the auger turns, to wedge a stone against the fence or move it to a location at which the auger flighting wedges the stone against the fence.

6. In a harvesting machine according to claim 5, wherein the conveyor means of the machine has at least one pair of augers rotating in side-by-side ducts which are open topped troughs having a common inner side wall that forms a ridge along the top thereof and is lower than the outer side walls of the troughs, the two augers rotating in opposite directions with the flighting thereof traveling upward at the outer sides of the troughs, each of the troughs having a said row of abutments to form a fence blocking passage of stones and each auger having a said fin, and said improvement being further characterized in that the rows of abutments on the two side-by-side troughs are substantially in line with one another transversely of the auger axes as are also the fins on the two augers.

7. In a harvesting machine according to claim 6, the improvement set forth therein further characterized in that the paired augers rotate in synchronism and the fins thereon travel towards one another at the top of their orbits.

* * * * *